March 7, 1933. T. OWADA 1,900,612
APPARATUS FOR TESTING WATCHES
Filed Sept. 8, 1932

Inventor:
Tokujiro Owada
By [signature]
Attorney.

Patented Mar. 7, 1933

1,900,612

UNITED STATES PATENT OFFICE

TOKUJIRO OWADA, OF SUKEGAWA-CHO, JAPAN, ASSIGNOR OF ONE-HALF TO KOJI KONISHI, OF TOKYO, JAPAN

APPARATUS FOR TESTING WATCHES

Application filed September 8, 1932. Serial No. 632,263.

This invention relates to an apparatus for testing watches and it has a particular relation to an apparatus for examining whether the watch under test is going correctly or whether it is advancing or retarding.

The main object of the invention is in providing an apparatus for testing a watch, which will indicate, as soon as the watch is simply placed on it, whether the same is going correctly or whether the same is advancing or retarding, showing at the same time the amount of deviation from the correct speed.

An ordinary method of testing a watch as heretofore employed is in comparing the watch under test with a chronometer whose degree of accuracy is known. However, such a method cannot be instantaneous, but requires a certain length of time, such as twenty-four hours, for accomplishing the comparison.

It has also been proposed to dismantle the watch mechanism, take out the balance wheel and to determine its period of oscillation by any suitable method. But the dismantling and the subsequent re-assembling of the watch mechanism are very troublesome operations, and this method of testing a watch is not a convenient one.

The present invention is based on the principle, well known in physics, that a moment of couple is displaceable parallel to the axis thereof. According to this principle, a couple acting on the balance wheel can be considered as displaced to an axis parallel to the axis of the balance wheel and passing through the centre of the watch. From this it follows that the watch itself is subjected to a rotational effort as result of the reaction of the oscillating motion of the balance wheel.

According to the present invention, a watch under test is supported so as to be freely oscillatable around an axis parallel to the axis of oscillation of the balance wheel, and allowed to oscillate at the same frequency as that of the balance wheel. The impulses resulting from this oscillation of the watch itself can be transmitted to a plurality of resonating bodies of known periods, such as pendulums, and in this manner the period of the balance wheel, or the instantaneous speed of the watch, can be determined by observing which of the series of the pendulums oscillate most violently.

Another feature of the invention is in the fact that instead of providing a multiplicity of resonators and observing which one of them oscillates most violently, only two resonators of different periods are employed. Of these, one has a period slightly greater and the other a period slightly smaller than the period which a correct or ideal balance wheel should have. When the watch under test is correct both the resonators will swing at equal amplitudes. When the watch is going too slowly or too fast, one of the two resonators will swing more violently than the other according to the circumstances. By employing only two resonators in this manner, the determination can be carried out very accurately by reason of the fact that the straight line portions of the resonance curves are utilized instead of more flat peak portions thereof.

For a better understanding of the invention, reference may now be had to the accompanying drawing forming a part of this specification, of which;

Figure 1:
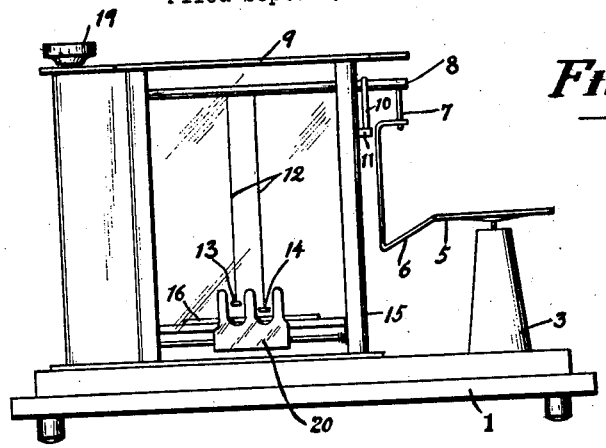
Fig. 1 is a front elevation of an apparatus embodying the present invention.
Figure 2:
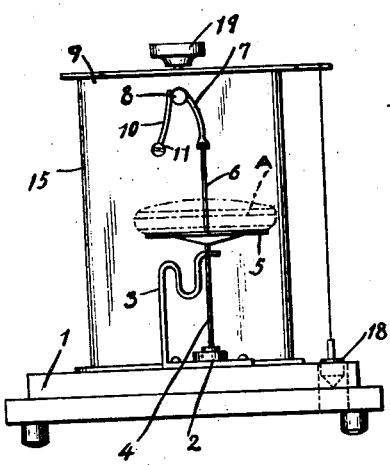
Fig. 2 is a side elevation thereof.
Figure 3:
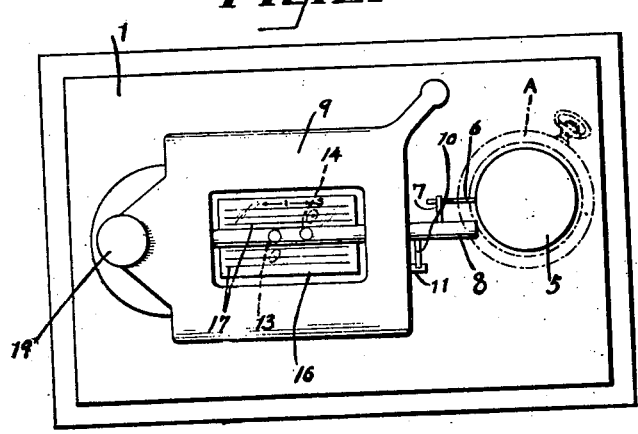
Fig. 3 is a plan thereof.

Referring to the drawing, the apparatus comprises a table 1 provided, adjacently to one side thereof, with two bearing members 2 and 3 rotatably supporting a vertical spindle 4, which has at its upper end a circular oscillatable seat 5 for receiving a watch to be tested A, as shown by the broken line in Figs. 2 and 3.

Secured to a portion of the seat 5, at its lower end, is a lever 6, which is adapted at its upper end to engage with the free forked end of the contact piece 7 depending from and rigid with the projected end of a horizontal rocking shaft 8 rotatably supported by the frame 9 of the apparatus. From the rocking shaft 8 and preferably by means of thin elastic wires 12 are suspended a pair of masses 13 and 14. Of these, the one 13 is of a period slightly smaller than that of the ideal balance wheel, while the other 14 is of a period slightly larger than that of the ideal balance wheel. 10 is a damper made of resilient material and fixed to a turnable pin 11 resiliently held to the side plate 15, and is adapted to be brought to contact with the shaft 8 for the purpose of limiting its motion, when the watch under test is of such a construction that the amplitude of its oscillation, and consequently that of the shaft 8 would otherwise be too large. Below the pendulums and upon the bottom portion of the frame is provided a graduated plate 16 having a series of transversal parallel lines 17 for facilitating the observation of the amplitudes of oscillation of the pendulums. 18 is a plumb bob for setting the apparatus to an exact horizontal position.

Considering the fact that the construction of the balance wheel of a watch is aimed so that it will oscillate exactly five times a second, that is to say, 300 times a minute, the natural frequency or the number of oscillations of one of the pendulums 13 should be so selected that it is slightly higher than that of the ideal balance wheel, say 301 per minute, while the other 14 should have a natural frequency slightly lower than that of the ideal balance wheel, say 299 per minute. When the natural frequencies of the two pendulums are selected in this manner and when the watch under test goes correctly, the two pendulums will oscillate equally. On the contrary, when the watch goes too slowly or too fast, either one of the two pendulums will swing more violently than the other according to the circumstances. The deviation of the speed of the watch can quite closely be determined by comparing the relative amplitudes of oscillation of the pendulums.

For arresting the pendelums in certain cases, such as for example during transportation, the frame is provided with a knob 19, the mere rotation of which will cause a plate 16 to displace upwardly along the frame, at the same time effecting a pivotal downward movement of the clamp 20 against the said plate 16. In this manner, the pendulums can be clamped between the plate 16 and the piece 20. The upward displacement of the plate 16 as well as the pivotal motion of the piece 20 may be effected from the knob 19 by the intermediary of any suitable means, such as gearing or cam mechanism (not shown), as interposed between the vertical shaft attached to the knob 19 and the members 16 and 20.

The operations of the apparatus are as follows:—

When the watch to be tested A is placed on the seat 5, the watch itself will be set to an angular oscillation on account of the reaction caused by the oscillatory motion of the balance wheel of the watch. The rocking shaft 8 accordingly will be rocked through the intermediary of the lever 6 and the contact piece 7. Consequently, the pendulums 13 and 14 will be set in oscillation as shown by broken lines in Fig. 3. When the oscillation of the balance wheel is adjusted to an exact correct condition, that is 300 oscillations per minute, the amplitudes of both the pendulums will be equal to each other.

When the watch is not going correctly, however, that is, when the motion of the balance wheel is not in the correct condition, the amplitudes of the respective pendulums will be different from each other. In this case, the amplitudes of oscillation of the pendulums can be observed from the top of the frame, and these can be compared by reference to the graduation lines 17, and the extent of the deviation of the instantaneous speed of the watch can be determined.

The top as well as the lateral sides of the frame 9 are covered with glass plates to facilitate the observation.

From the foregoing description, it will be apparent that I have devised a very efficient and simple apparatus by means of which the instantaneous speed of a watch can be determined without having recourse to any troublesome operation, such as dismantling the watch mechanism.

What I claim is:—

1. An apparatus for testing a watch, which comprises means for supporting the watch under test in such a manner that it is freely oscillatable around an axis parallel to the axis of oscillation of the balance wheel of the watch, a plurality of resonators of different natural frequencies, and means to transmit the oscillatory impulses of the watch to the resonators.

2. An apparatus for testing a watch, which comprises means for supporting the watch under test in such a manner that it is freely oscillatable around an axis parallel to the axis of oscillation of the balance wheel of the watch, two resonators of different natural frequencies, of which the natural frequency of one of them is slightly higher and the other is slightly lower than that of the ideal balance wheel, and means to transmit the oscillatory impulses of the watch to the resonators.

In testimony whereof, I affix my signature.

TOKUJIRO OWADA.